United States Patent [19]

Alfio

[11] 4,139,164
[45] Feb. 13, 1979

[54] METHOD AND DEVICE FOR WINDING BOBBINS OF RUBBERY AND ESSENTIALLY EXTENSIBLE TAPE MATERIAL

[75] Inventor: Deregibus Alfio, Padova, Italy

[73] Assignee: The Goodyear Tire & Rubber Company, Akron, Ohio

[21] Appl. No.: 841,778

[22] Filed: Oct. 13, 1977

[30] Foreign Application Priority Data

Apr. 5, 1977 [IT] Italy .................... 23158 A/77

[51] Int. Cl.² .................................. B35H 35/02
[52] U.S. Cl. ............................ 242/56.4; 242/67.1 R
[58] Field of Search ............. 242/56.2, 56.3, 56.4, 242/56.5, 56.6, 56.7, 67.1 R, 67.2, 67.3 R

[56] References Cited

U.S. PATENT DOCUMENTS

| 125,597 | 4/1872 | Mayall | 242/56.4 |
| 1,790,582 | 1/1931 | Graham | 242/67.1 R |
| 3,086,726 | 4/1963 | Aaron | 242/56.5 X |
| 3,777,998 | 12/1973 | Jores | 242/56.2 |

*Primary Examiner*—Edward J. McCarthy
*Attorney, Agent, or Firm*—R. S. Washburn

[57] ABSTRACT

In an apparatus for the simultaneous winding of parallel tapes onto bobbins rotated by contact with an upper run of a conveyor mat carrying the tapes, each of the hubs for the bobbins is carried at the free end of a respective cantilever arm which is pivoted for movement in a vertical plane above the conveyor mat, the cantilever arms all being mounted on respective pivots on a frame structure positioned at one side only of the conveyor mat so as to leave free access at the other side.

1 Claim, 5 Drawing Figures

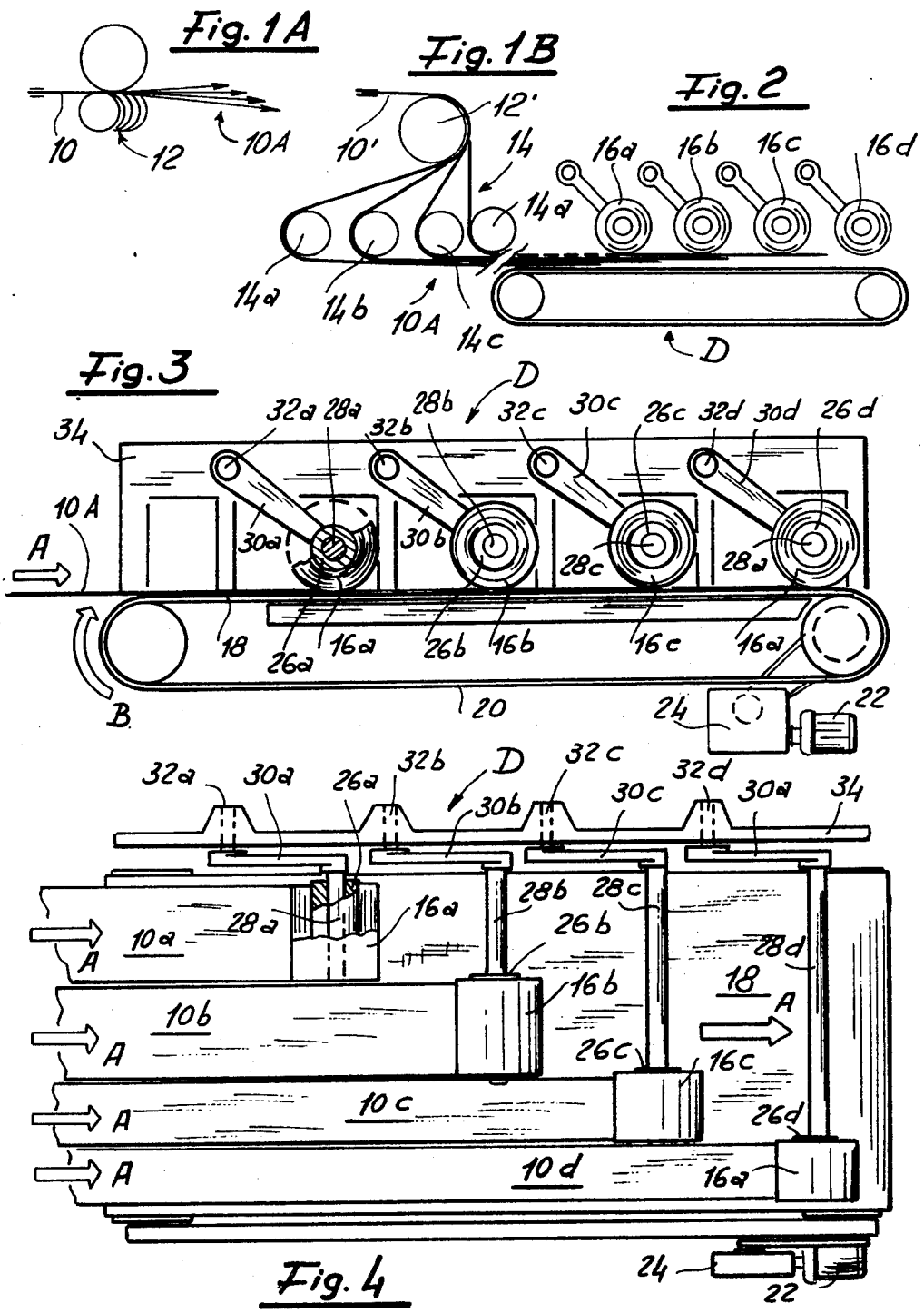

METHOD AND DEVICE FOR WINDING BOBBINS OF RUBBERY AND ESSENTIALLY EXTENSIBLE TAPE MATERIAL

BACKGROUND OF THE INVENTION

1. Field of the Invention

This invention concerns a method, as well as a device for its application and industrial utilization, for the assembly, on bobbins, of tape material, in particular elastically extensible or substantially extensible, such method and device being particularly intended for the formation of bobbins, starting preferably from tape material of considerable width, of tape suitable for assembly, to be wound around a suitable core, of hose and pieces of hose in natural or synthetic rubber, possibly reinforced with layers of fabric.

More specifically, this invention concerns suitable modality and means to constitute an operative stage and respectively an element or operative unit of a complete procedure and respectively a plant for the manifacture of pieces of hose of great length, in natural or synthetic rubber, the said procedure and the said plant forming the subject of other contemporaneous application by the same Applicant, and whose context reference is herein made, for the better understanding of some of technical and industrial presuppositions of this some invention.

Moreover, the above indicated application of this invention does not constitute limitations of the domain of the patent application, in that the invention subject here could find advantageous industrial utilization in equivalent fields.

2. Description of the Prior Art

It is known that the winding in bobbins of tape material susceptible to contraction and other deformations, when subjected to stress in a predetermined direction, in particular in the direction of the length of the tape, presents drawbacks and difficulties. The traditional way of winding these tapes, around motorized bobbins, subjects the tapes to a tractive force, which can cause an excessive tightening of their coils. Furthermore, the spin velocity to be given to the bobbins must vary progressively, in particular, it must be reduced, in ratio to the progressive increase in the diameter of the bobbin being formed, in order to avoid excessive variations in the return speed of the tape material to be wound. There exist winding machines ans other equivalent devices, with very complex construction and control, whose motors are operated through complicated feeding systems and/or are dependent on control devices of the tension of the material returned to be wound. These known means, apart from being cumbersome, are rather complicated and their operating can present irregularities, for example, because of even minimal variations in thickness and/or elastic strength of the tape material being handled.

SUMMARY OF THE INVENTION

That being stated, the subject of this invention is a method and a device of considerable constructive simplicity, of absolute safety and regularity of service, not subject to the above mentioned limitations.

Also subject of this invention is the realization of a method and a device as described above, also capable of contemporaneously and regularly carrying out the winding, in parallel, of a number of bobbins individually formed by tapes obtained, by means of cutting or longitudinal separation of a primary tape of greater and even considerable length.

Essentially, according to the invention, the method consists in the feeding of the tape-like material or materials to be wound on to a carrying table, in particular on to a carrying mat, advancing at a predetermined velocity, in preliminarly attaching the beginning or head of the said materials to a hub or respectively to a number of hubs supported in a freely rotary way around pivots with the axis parallel to the said table and perpendicular to the advancing direction of the same, but in a moving, particularly descending, manner due to the effect of its dead weight (and with the possible contribution of elastic means and/or counter-weights) towards the said table, in such a way that the said hubs and the winding around them are made to rotate so that they adhere tangentially to the said table, and consequently the winding is carried out with a uniform rim velocity and determined only by the linear velocity of the supporting plane, and it proceeds essentially without imposing tension on to the wound material, and moreover whose coils superimpose in a uniform manner, without substantial tightening, with the formation of bobbins having any desired diameter, even very large.

According to a preferred form of execution of the device including means collaborating with the application of the said method, a large number of hubs are allowed for, individually supported in a way that they can be lowered, with parallel axes and spaced in the direction of the advancing conveyor belt, the said pivots being supported in the way above described as a cantilever, from a supporting structure arranged on one side of the said table. In this way, all the hubs and all the winding being done around the respective pivots being accessible and also removable and/or replaceable, as necessary, the one independent of the other.

These and other more specific characteristics of the invention, and the quantitative and qualitative advantages in production and industrial processing consequent to the application of the invention, will appear evident in the course of the following detailed description of not limitative examples of the arrangement of the device subject here, reproduced in the drawings.

BRIEF DESCRIPTION OF THE DRAWINGS

FIGS. 1a and 1b schematically represent variations in the arrangement of the complementary upstream device for the cutting of wide tapes in raw, vulcanizable rubber, and preferably usable for the cutting of homogeneous tapes in rubber and respectively of "linenized" tapes;

FIG. 2 schematically represents the device downstream for the winding, according to the method subject here, of the said tapes, in as many bobbins;

FIG. 3 represents, to scale and in greater detail but with semplifications and omissions of the purely constructive details and which are individually included in the technical note, the device of FIG. 2, and FIG. 4 similarly represents the device of FIG. 3, from above.

DESCRIPTION OF THE PREFERRED EMBODIMENTS

With particular reference to the figures of the drawing: as schematically represented in FIG. 1a, the primary or initial tape material, indicated as 10, is subdivided, for example, by means of a cutting device 12, with fixed knives or discs, into a large number of tapes, indicated as a whole as 10A, to be individually wound on to as many bobbins, for their utilization. When it is a question of dealing with a primary material formed by a rubberized fabric 10', or "linenized" rubber tape, which can be cut by tearing, the device 12 can be substituted by a tearing system in which the said material 10', starting from a return roller 12', and with a previous manual start (by means of cutting) of the tearing line, is sent, with its tape-like parts side by side, in a number of different directions, schematically indicated as 14, by means of return rollers 14a, 14b, 14c and 14d (the number of these return rollers is obviously variable, depending on the number of narrow tapes required) in such a way that narrower tapes are obtained from the primary tape, which are then wound individually in to bobbins 16a and respectively 16b, 16c and 16d, as schematized in FIGS. 1B and 2.

This winding is carried out by means of a winding device indicated as a whole as D and a constructive example of which is reproduced, even though with some schematizations and simplifications in detail, in FIGS. 3 and 4.

This device winds the single tapes, obtained from the subdivision of the primary tape 10 (or 10'), on to the single bobbins, under the favourable conditions of rigorous uniformity previously mentioned. These single tapes, which have been represented in the exemplary number of four, can be of either the same or different width (as shown in FIG. 4 for example) and their width does not influence the desired conditions of uniform handling and treatment.

All the tapes 10A (FIG. 3) fed in the direction A are sent along the upper carrying level of a conveyor mat 20, essentially horizontal, circuiting in direction B under the power of a motor 22, and preferably through a moto-variator 24 and a suitable transmission, to be operated in rigorous observance with the feeding speed of the said tapes. These tapes therefore reach the said level and are fed on to the carrying level 18 of the conveyor mat and advance under strict conditions of parallelism and uniformity.

The single bobbins 10a-10d are individually wound around the hubs 26a-26d supported in a freely rotary way, by means of suitable bearings (not illustrated) around shafts 28a-28d, which have a cantilever mount on the extremity of the arms 30a-30d which can be individually oscillated around the axes of the pivots 32a-32b, supported in a rotary way by a fixed framework 34 placed by the side of the space overhanging the conveyor mat.

The axes of the shafts 28a-28d and of the pivots 32a-32d are all parallel to each other and with the plane defined by the carrying arm 18 of the conveyor mat, as well as perpendicular to the said direction A of advancement. Furthermore, the axes of the pivots are further back (with respect to advancing direction A) in relation to the axes of the shafts connected to the respective arms. Therefore, these arms 30a-30d materialize as many crank arms, whose pivots (in 32a-32d) occupy a fixed position, and whose pins (in 28a-28d) can freely be lowered, with a possible contribution of counter-weights, elastic means or other (not represented) in such a way that the hubs 26a-26d and the bobbins 16a-16d in the course of winding around them, can bear down upon the said carrying arm 18 of the conveyor mat. Previously restraining and possibly beginning the winding of the ends of the tapes 10a-10d around the respective hubs, the winding of all the bobbins proceeds in parallel, by tangential pulling of the tapes which, not being subjected to stress on the said mat, are therefore wound into close but not tight coils, and that is in the best condition for the successive use of the tapes themselves (in the preferred and foreseen field of application, for their winding around cores and their formation into rubber hose).

As can be observed in detail in FIG. 4, the shafts 28a-28d are of different lengths, in order to position the respective hubs 26a-26d in as many positions on the width of the conveyor mat, corresponding to the alignment defined by the respective tapes 10a 10d, and without giving rise to interference between the advancing and the wound tapes.

Furthermore, the bobbins 16a-16d in the course of formation are all accessible from one side (opposite to the structure 34) of the device, in such a way that these tapes and the bobbins formed from them are constantly accessible, for the starting of the process, the control of their regular winding and so as to allow the substitution, even independently of said tapes, of the bobbins and any intervention which may become necessary.

Given, however, that the method and the device in question have only been described and represented as an indicative but not limitative example, it is evident that both of them could be realized by adopting numerous different constructive solutions, according to the specific conveniences and requirements of manifacture, installation and arrangement of a complete production "line", without leaving the range of this invention, in particular as defined in the following claims.

I claim:

1. Apparatus, for winding into individual bobbins a plurality of tapes derived from a common sheet of fabric reinforced rubber by parting the sheet along parallel lines, comprising:

(i) a machine frame structure (ii) a conveyor mat engaged about spaced end rollers journalled on the machine frame structure, said conveyor mat including a plane upper run (iii) means for guiding the plurality of tapes onto the upper run of the conveyor mat in side-by-side parallel positions (iv) drive means coupled to one said end roller for driving the conveyor mat in a direction for drawing the plurality of tapes onto the conveyor mat (v) a plurality of pivots, in the same number as the number of tapes, on a portion of the machine frame structure disposed at one side only of the upper run of the conveyor mat, the pivots being disposed serially in the direction of movement of the upper run of the conveyor mat and having their axes lying in a common plane parallel to the upper run (vi) corresponding plurality of cantilever arms each carried on a respective pivot and extending from the pivot at an inclination downwards towards the upper run and in the direction of movement of the upper run, the arms all being disposed laterally of and at a level higher than the upper run (vii) a corresponding plurality of shafts each carried on the free end of a respective cantilever arm and extending from the arm transversely over the upper run normal to the direction of movement of the upper run and parallel thereto (viii) a corresponding plurality of hubs each carried in freely rotatable manner on a respective one of the shafts, the shafts being of different lengths and the hubs being disposed each at a respective transverse position corresponding to one of the tapes carried on the upper run, each hub being raisable, by movement of its cantilever arm about its pivot, to accommodate increasing radius as a bobbin of the tape is wound onto the hub by movement of the upper run causing rotation of the bobbin resting thereon.

* * * * *